(12) United States Patent
Cox et al.

(10) Patent No.: US 8,292,141 B2
(45) Date of Patent: Oct. 23, 2012

(54) METHOD FOR SEPARATING A PANE OF BRITTLE MATERIAL FROM A MOVING RIBBON OF MATERIAL

(75) Inventors: Judy Kathleen Cox, Corning, NY (US); Michael Albert Joseph, II, Corning, NY (US); Kenneth Spencer Morgan, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 151 days.

(21) Appl. No.: 12/483,322

(22) Filed: Jun. 12, 2009

(65) Prior Publication Data
US 2009/0250497 A1 Oct. 8, 2009

Related U.S. Application Data

(63) Continuation of application No. 11/131,125, filed on May 17, 2005, now abandoned.

(51) Int. Cl.
*B26D 3/08* (2006.01)
*B26F 3/00* (2006.01)
*C03B 33/02* (2006.01)

(52) U.S. Cl. .............. 225/2; 225/4; 225/5; 225/96.5; 225/103; 225/104; 65/112; 83/880

(58) Field of Classification Search .......... 225/4, 5, 225/96.5, 100, 103–105, 2, 94, 96; 83/319, 83/879, 880; 65/97, 105, 112, 174
See application file for complete search history.

(56) References Cited

U.S. PATENT DOCUMENTS

| | | | | |
|---|---|---|---|---|
| 1,529,243 A | 3/1925 | Drake et al. | ................ | 198/841 |
| 1,626,396 A | 4/1927 | Drake | ................ | 198/834 |
| 1,831,629 A | 11/1931 | Mambourg | ................ | 65/197 |
| 1,854,506 A | 4/1932 | Drake | ................ | 198/834 |
| 3,164,046 A * | 1/1965 | Arnaud | ................ | 83/880 |
| 3,165,017 A * | 1/1965 | Galabert | ................ | 83/880 |
| 3,486,673 A * | 12/1969 | Madge | ................ | 225/2 |
| 3,543,979 A | 12/1970 | Grove et al. | ................ | 225/2 |
| 3,785,229 A * | 1/1974 | Halberschmidt et al. | ....... | 83/879 |
| 3,892,153 A * | 7/1975 | Kato | ................ | 83/100 |

(Continued)

FOREIGN PATENT DOCUMENTS
JP 10-291826 11/1998
(Continued)

OTHER PUBLICATIONS

Daudeville, L., Bernard F., Gy, R.: *Residual Stresses Near Holes in Tempered Glass Plates*, Materials Science Forum, 404-407 (2002): 43-48. http://geo.hmg.inpg.fr/~daudevil/publis.html.

(Continued)

*Primary Examiner* — Clark F. Dexter
(74) *Attorney, Agent, or Firm* — Kevin M. Able

(57) ABSTRACT

A pane is separated from a moving ribbon of brittle material by restraining the ribbon upstream of a score line prior to separating the pane. The ribbon is restrained by selectively contacting a first side and a second side of the ribbon in one of an opposite, overlapping or offset relation. The ribbon can be restrained prior to, substantially simultaneous with or subsequent to forming the score line. The restrained status of the ribbon is maintained during and immediately after separation of the pane from the ribbon, thereby reducing the introduction of a disturbance or bending moment into the upstream ribbon.

16 Claims, 14 Drawing Sheets

U.S. PATENT DOCUMENTS

| | | | | |
|---|---|---|---|---|
| 3,934,995 | A | 1/1976 | French | 65/97 |
| 4,088,255 | A | 5/1978 | DeTorre | 225/98 |
| 4,109,841 | A | 8/1978 | DeTorre | 225/96.5 |
| 4,136,807 | A | 1/1979 | DeTorre | 225/2 |
| 4,256,246 | A | 3/1981 | Kindel | 225/103 |
| 4,306,672 | A | 12/1981 | Johannes | 225/97 |
| 4,444,077 | A * | 4/1984 | Wise et al. | 83/319 |
| 4,489,870 | A | 12/1984 | Prange et al. | 225/2 |
| 4,743,284 | A * | 5/1988 | Mouly et al. | 65/113 |
| 5,300,806 | A * | 4/1994 | McClurg | 257/594 |
| 5,303,861 | A | 4/1994 | Allaire et al. | 225/2 |
| 5,597,345 | A | 1/1997 | Young | 451/165 |
| 5,609,284 | A | 3/1997 | Kondratenko | 225/1 |
| 5,776,220 | A | 7/1998 | Allaire et al. | 65/112 |
| 5,826,772 | A | 10/1998 | Ariglio et al. | 225/2 |
| 6,098,861 | A | 8/2000 | Inoue | 225/96.5 |
| 6,148,810 | A | 11/2000 | Hepworth | 125/23.01 |
| 6,218,793 | B1 | 4/2001 | Bando | 318/39 |
| 6,247,625 | B1 | 6/2001 | Chakrabarti et al. | 225/96.5 |
| 6,276,585 | B1 | 8/2001 | Naughton | 225/96.5 |
| 6,327,875 | B1 | 12/2001 | Allaire et al. | 65/103 |
| 6,463,762 | B1 | 10/2002 | Ross, Jr. | 65/105 |
| 6,502,423 | B1 | 1/2003 | Ostendarp et al. | 65/29.14 |
| 6,592,703 | B1 | 7/2003 | Habeck et al. | 156/257 |
| 6,616,025 | B1 | 9/2003 | Andrewlavage, Jr. | 225/96.5 |
| 6,722,545 | B2 | 4/2004 | Yuyama et al. | 225/96.5 |
| 6,744,009 | B1 | 6/2004 | Xuan et al. | 219/121.67 |
| 6,787,732 | B1 | 9/2004 | Xuan et al. | 219/121.67 |
| 6,831,029 | B2 | 12/2004 | Chacon et al. | 501/66 |
| 7,080,766 | B2 | 7/2006 | McEntee et al. | 225/96.5 |
| 7,234,620 | B2 * | 6/2007 | Andrewlavage, Jr. | 225/1 |
| 2003/0019243 | A1 | 1/2003 | Biethmann et al. | 65/112 |
| 2004/0055335 | A1 | 3/2004 | Lee | 65/95 |
| 2006/0249553 | A1 * | 11/2006 | Ukrainczyk | 225/2 |
| 2007/0039990 | A1 * | 2/2007 | Kemmerer et al. | 225/2 |

FOREIGN PATENT DOCUMENTS

| | | |
|---|---|---|
| JP | 2001130920 A | 5/2001 |
| JP | 2001180957 A | 7/2001 |

OTHER PUBLICATIONS

Brow, R.K., *Viscosity*, Course Notes Cer103, R.K. Brow, Shelby Chapter 6, last updated Dec. 30, 2004. http://web.umr.edu/~brow/.

H.L. Langhaar, et al., "Engineering Mechanics—Statics", McGraw-Hill Book Company, Inc., 1959, p. 17.

* cited by examiner

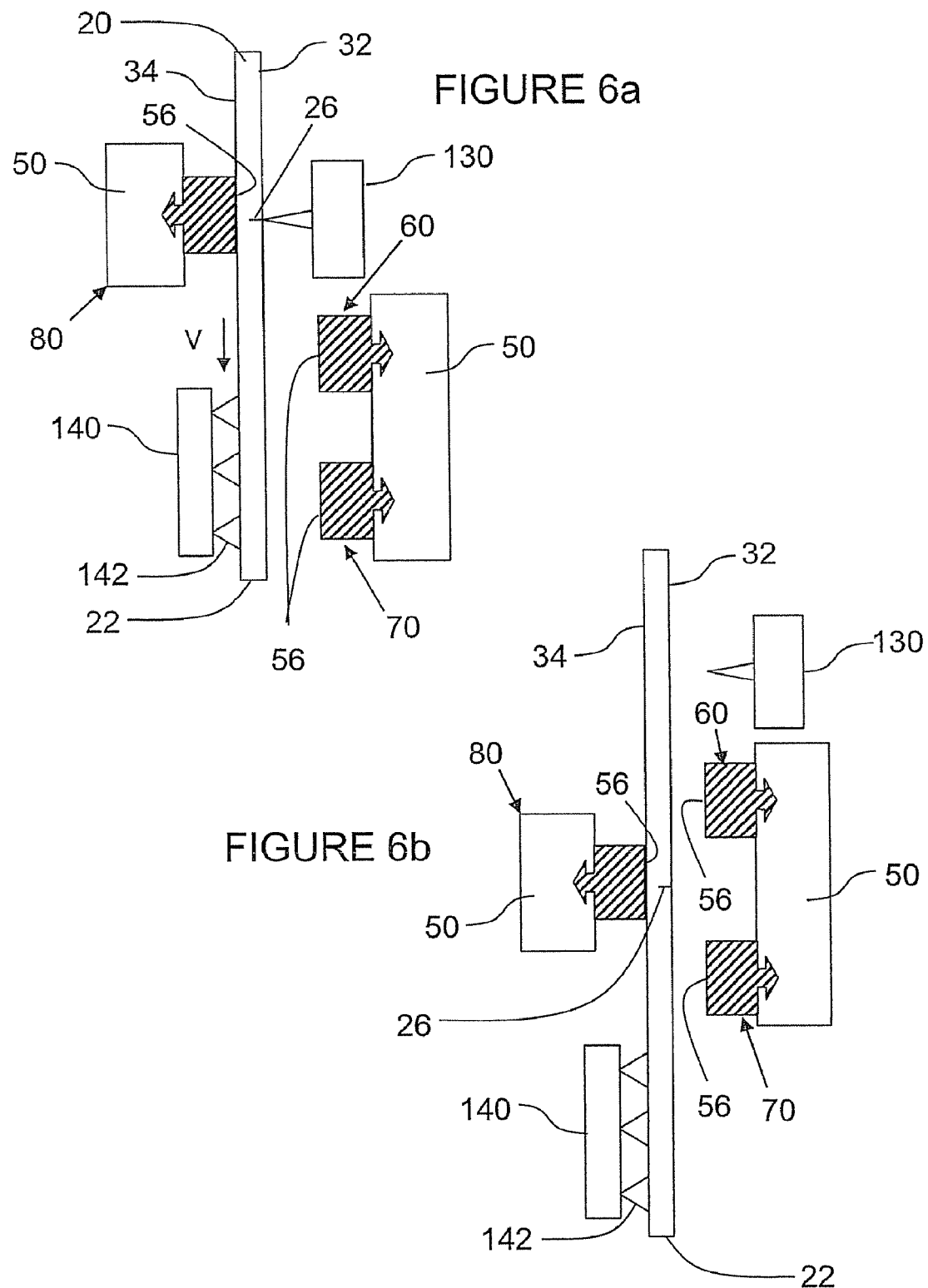

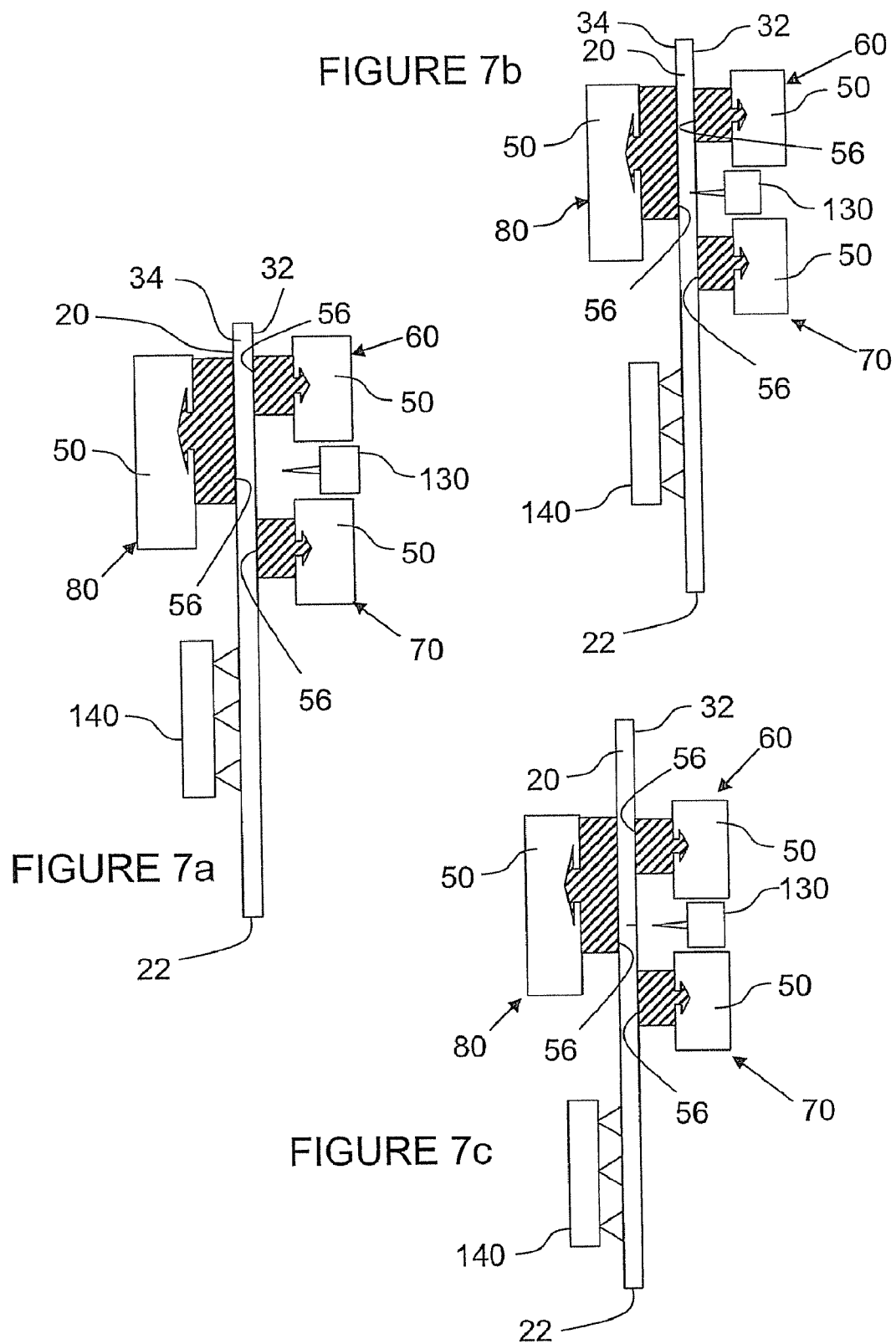

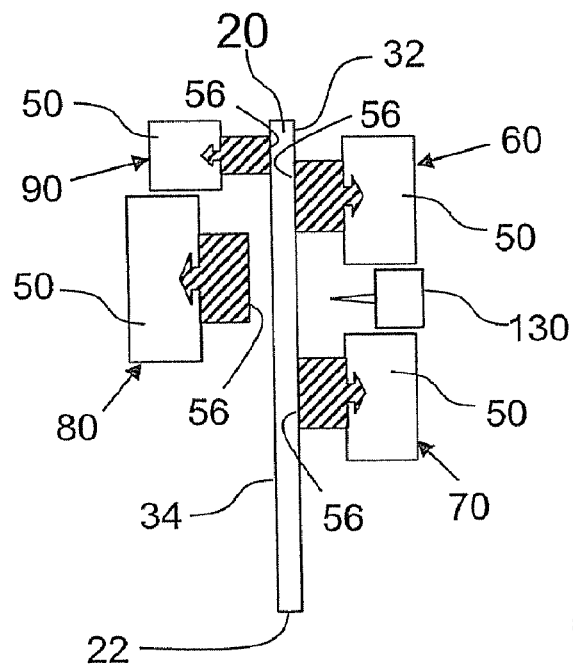
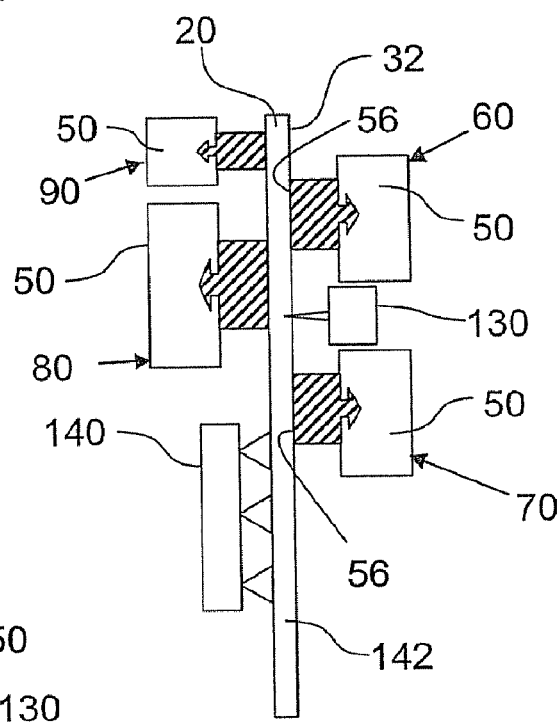
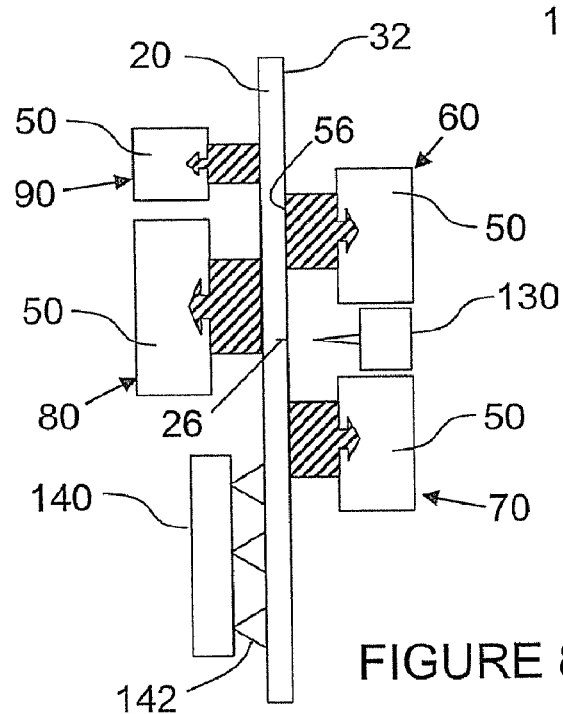

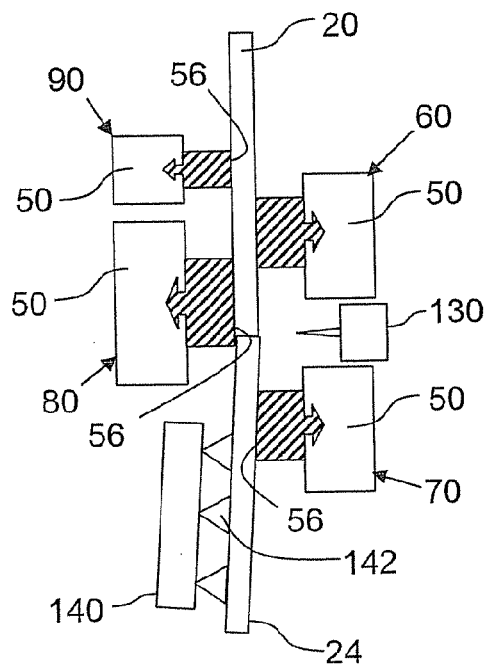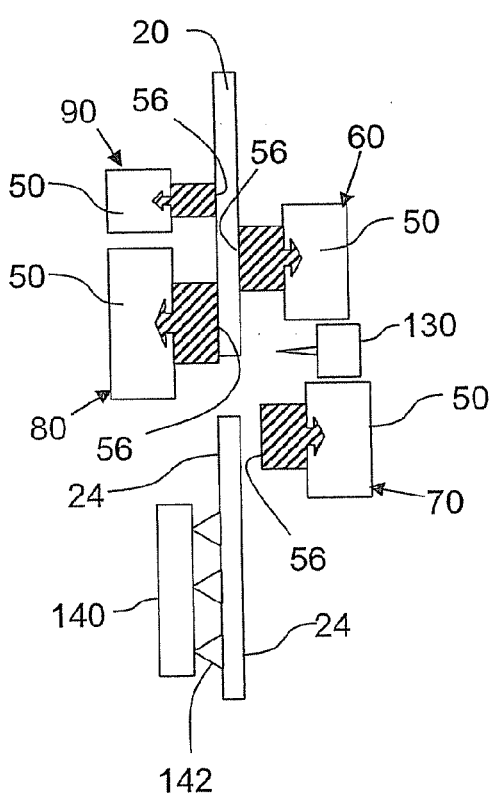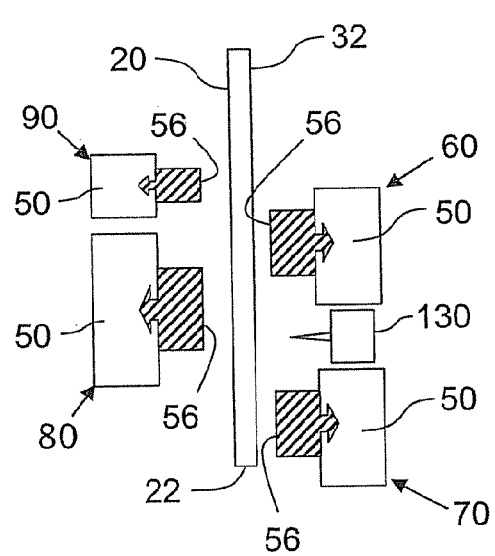

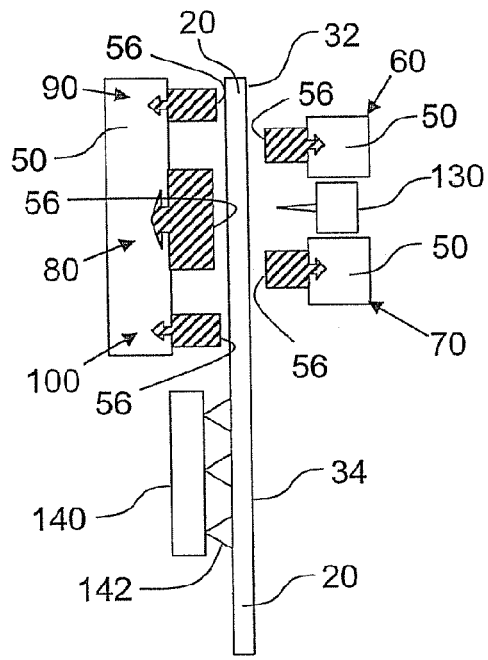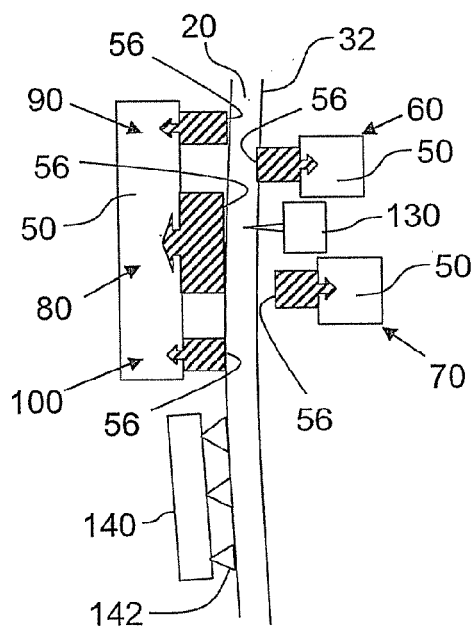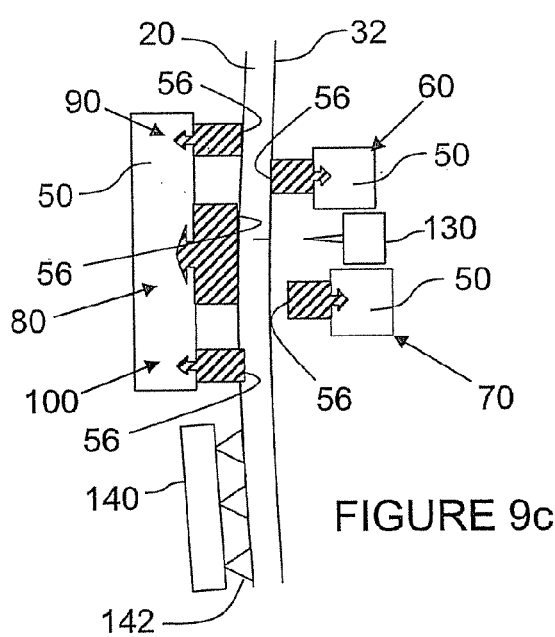

METHOD FOR SEPARATING A PANE OF BRITTLE MATERIAL FROM A MOVING RIBBON OF MATERIAL

This is a continuation of U.S. patent application Ser. No. 11/131,125 filed on May 17, 2005 now abandoned, the content of which is relied upon and incorporated herein by reference in its entirety, and the benefit of priority under 35 U.S.C. §120 is hereby claimed.

BACKGROUND OF THE INVENTION

1. Field of the Invention

The present invention relates to separating a pane of a brittle material from a moving ribbon of the material, and in one configuration, to separating panes of glass from a moving ribbon of glass, while reducing the introduction of disturbances into the upstream ribbon.

2. Description of Related Art

Specialized glasses have found increased applicability, including substrates, in the manufacture of display devices. For example, liquid crystal displays (LCDs) have become increasingly popular for displaying information in calculators, watches, video games, audio and video equipment, portable computers and even car dashboards. The improving quality and size of LCDs has made the LCDs an attractive alternative to cathode ray tubes (CRTs) which are traditionally used in television sets and desktop computer displays. In addition, other flat panel display (FPD) types, such as plasma displays (PDs), field emission displays (FEDs) and organic light-emitting polymer displays (OLEDs) are being developed as alternatives to LCDs. Thin film transistor liquid crystal displays (TFT-LCD) are used in notebook computers, flat panel desktop monitors, LCD televisions, and Internet and communication devices, to name only a few. It is increasingly useful to incorporate electronic components onto a glass sheet (glass substrate) used in the display device. Some display devices such as TFT-LCD panels and OLED panels are made directly on flat glass sheets. For example, the transistors are arranged in a patterned array and are driven by peripheral circuitry to provide (switch on) desired voltages to orient the molecules of the LC material in the desired manner.

In-plane stress (and resulting strain) can result in a variation of the alignment of the transistors and the pixels. This can result in distortion in the display panel. As such, in LCD and other glass display applications, it is exceedingly beneficial to provide glass (substrates) that are within acceptable tolerances for distortion.

Flat panel display manufacturers are finding that demands for larger display sizes and the economies of scale are driving manufacturing processes to larger size pieces of glass. Industry standards have evolved from Gen III (550 mm×650 mm), Gen III.5 (600 mm×720 mm), and Gen IV (1,000 mm×1,000 mm) sizes and larger. As the desired size of the glass pieces increases, the difficulty of the production and handling increases.

The manufacturing of the glass used as the substrate is extremely complex. The drawdown sheet or fusion process, described in U.S. Pat. No. 3,338,696 (Dockerty) and U.S. Pat. No. 3,682,609 (Dockerty), herein incorporated by reference, is one of the few processes capable of delivering the glass without requiring costly post forming finishing operations such as lapping and polishing.

However, the fusion process requires the separation and removal of panes from a continuously moving ribbon of glass. Traditionally, the separation of the panes has been performed by forming a separation line in the ribbon of glass. Then a vacuum cup array is attached to the glass below the score line and the portion of the ribbon below the score line is rotated less than 15° to cause the glass to break at the score line and thus form the desired glass pane. This breaking produces a newly formed leading edge on the moving ribbon and a newly formed trailing edge on the glass pane.

However, this exertion of such a large bending moment on the ribbon, imparts significant potential energy to the ribbon, particularly upon the snapping of the pane from the ribbon. Introduction of this energy (and mechanical disturbance) into the upstream ribbon can lead to undesirable characteristics in subsequent glass panes.

Therefore, there is a need to provide for the separation of a pane from a continuously moving ribbon of brittle material, while reducing imparted disturbances which can propagate upstream along the ribbon. The need also exists for increasing control over the crack propagation used to separate a pane from the ribbon.

BRIEF SUMMARY OF THE INVENTION

The present system provides for the repeatable and uniform separation of a pane of brittle material from a continuously moving ribbon of the brittle material, while reducing the introduction of disturbances into the upstream ribbon.

In selected configurations, the system provides for the separation of a pane of glass from a continuously moving ribbon of glass. For purposes of description, the following discussion is set forth in terms of glass manufacturing. However, it is understood the invention as defined and set forth in the appended claims is not so limited, except for those claims which specify the brittle material is glass.

In the fusion glass formation process, a glass ribbon transitions from a liquid state to a downstream solid state. The introduction of disturbances into the glass in the visco-elastic region of the glass can result in undesired nonuniformity or stresses in the resulting solid state glass. Traditionally, the separation of a pane from the ribbon introduced significant energy in the form of a vibration, wave or distortion to the solid portion of the ribbon. Such distortion migrates upstream into the visco-elastic region of the ribbon. The distortion can introduce nonuniformity and nonlinearity in an uncontrolled manner, and can decrease the quality of the resulting panes.

In the present system, the ribbon is restrained upstream of a score line prior to separating the pane from the ribbon. The restraint of the ribbon can be accomplished by contacts upstream of the score line on the first side and the second side of the ribbon, wherein the contacts are either opposite, overlapping or offset. The restraint can be prior to, substantially simultaneous with or subsequent to forming the score line in the ribbon. The restraint of the ribbon is selected to facilitate separation of a pane from the ribbon and minimize or reduce the introduction of a disturbance or bending moment into the upstream ribbon.

The present system separates the pane from the ribbon and reduces the propagation of disturbances upstream in the ribbon by contacting opposing sides of the ribbon with a pair of opposing bars, wherein the bars move with the ribbon, thereby restraining a portion of the ribbon upstream of a score line. A downstream press bar contacts the ribbon downstream of a score line to separate the pane from the ribbon along the score line, while the ribbon is temporarily restrained upstream of the separation line.

Additional features and advantages of the invention are set forth in the detailed description which follows, and in part will be readily apparent to those skilled in the art from that description or recognized by practicing the invention as described herein.

It is to be understood that both the foregoing general description and the following detailed description are merely exemplary of the invention, and are intended to provide an overview or framework for understanding the nature and character of the invention as claimed below. Also, the above listed aspects of the invention, as well as the preferred and other embodiments of the invention discussed and claimed below, can be used separately or in any and all combinations.

The accompanying drawings are included to provide a further understanding of the invention, and are incorporated in and constitute a part of this specification. The drawings illustrate various embodiments of the invention, and together with the description serve to explain the principles and operation of the invention. It should be noted that the various features illustrated in the figures are not necessarily drawn to scale. In fact, the dimensions may be arbitrarily increased or decreased for clarity of discussion.

BRIEF DESCRIPTION OF THE SEVERAL VIEWS OF THE DRAWINGS

FIGS. 6a-6d are side elevational schematic views of a first configuration for the separation of a pane from the ribbon.

FIGS. 7a-7f are side elevational schematic views of a second configuration for the separation of a pane from the ribbon.

FIGS. 8a-8f are side elevational schematic views of a third configuration for the separation of a pane from the ribbon.

FIGS. 9a-9f are side elevational schematic views of a fourth configuration for the separation of a pane from the ribbon.

DETAILED DESCRIPTION OF THE INVENTION

In the following detailed description, for purposes of explanation and not limitation, example embodiments disclosing specific details are set forth in order to provide a thorough understanding of the present invention. However, it will be apparent to one having ordinary skill in the art having had the benefit of the present disclosure, that the present invention can be practiced in other embodiments that depart from the specific details disclosed herein. Moreover, descriptions of well-known devices, methods and materials are omitted so as not to obscure the description of the present invention.

The present invention relates to the separation of a pane of brittle material from a moving ribbon of the material, wherein selected configurations reduce separation induced upstream disturbances to the ribbon. For purposes of description, the present invention is set forth as separating glass panes from a moving ribbon of glass.

Figure 1:
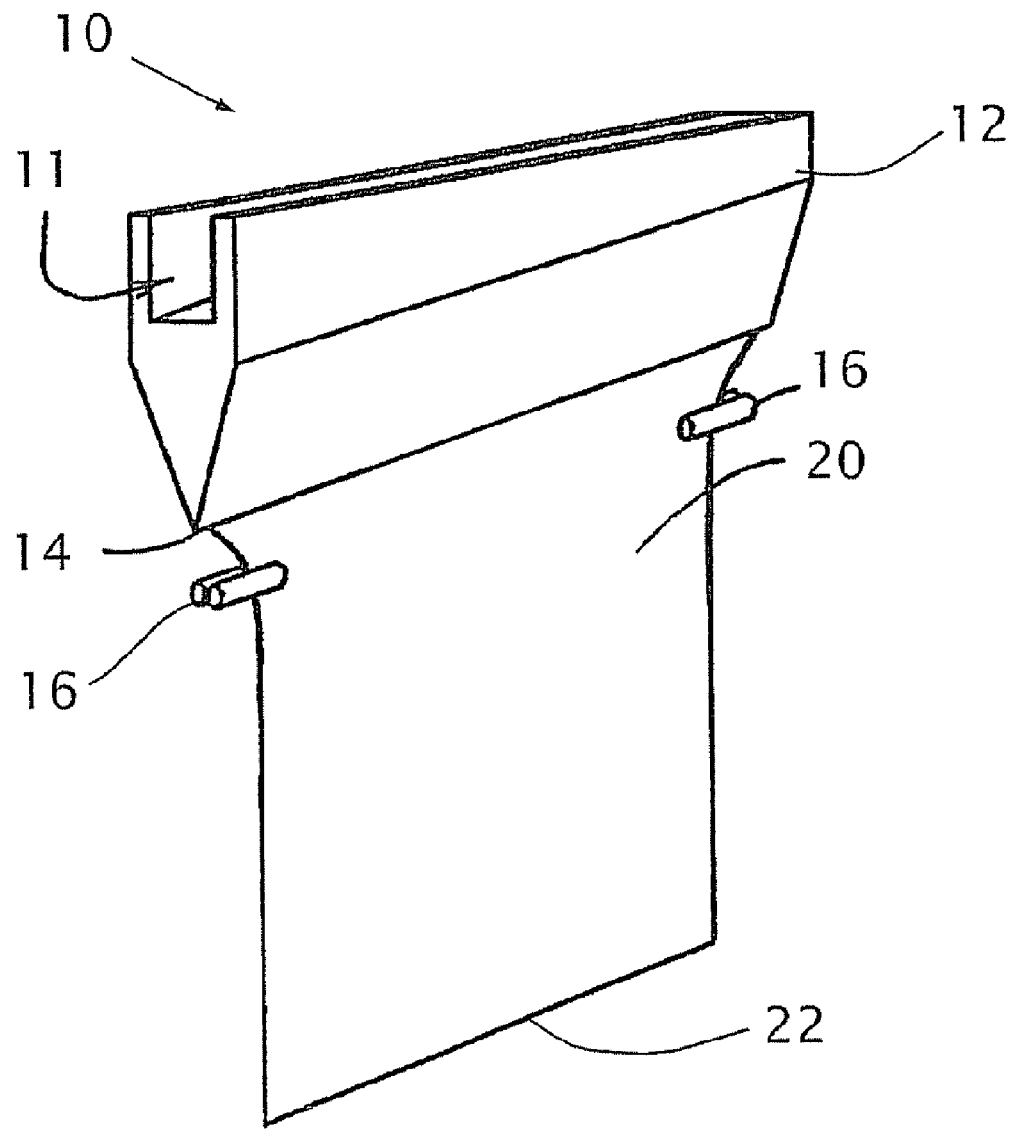
FIG. 1 is a schematic view of a fusion glass fabrication apparatus.

FIG. 1 is a schematic diagram of glass fabrication apparatus 10 of the type typically used in the fusion process. Apparatus 10 includes forming isopipe 12, which receives molten glass (not shown) in cavity 11. The molten glass flows over the upper edges of cavity 11 and descends along the outer sides of isopipe 12 to root 14 to form a ribbon of glass 20. Ribbon of glass 20, after leaving root 14, traverses fixed edge rollers 16. Ribbon 20 of brittle material is thus formed and has a length extending from root 14 to terminal free end 22. As glass ribbon 20 travels down from isopipe 12, the ribbon changes from a supple 50 millimeter thick liquid form at, for example, root 14 to a stiff glass ribbon of approximately 0.03 mm to 2.0 mm thickness at terminal end 22.

Such draw down sheet or fusion processes, are described in U.S. Pat. No. 3,338,696 (Dockerty) and U.S. Pat. No. 3,682,609 (Dockerty), herein incorporated by reference. The details are omitted so as to not obscure the description of the example embodiments. It is noted, however, that other types of glass fabrication apparatus can be used in conjunction with the invention. For those skilled in the art of glass forming, it is known that there are multiple methods to achieve such a structure, such as laminated down draw, slot draw and laminated fusion processes.

Figure 2:
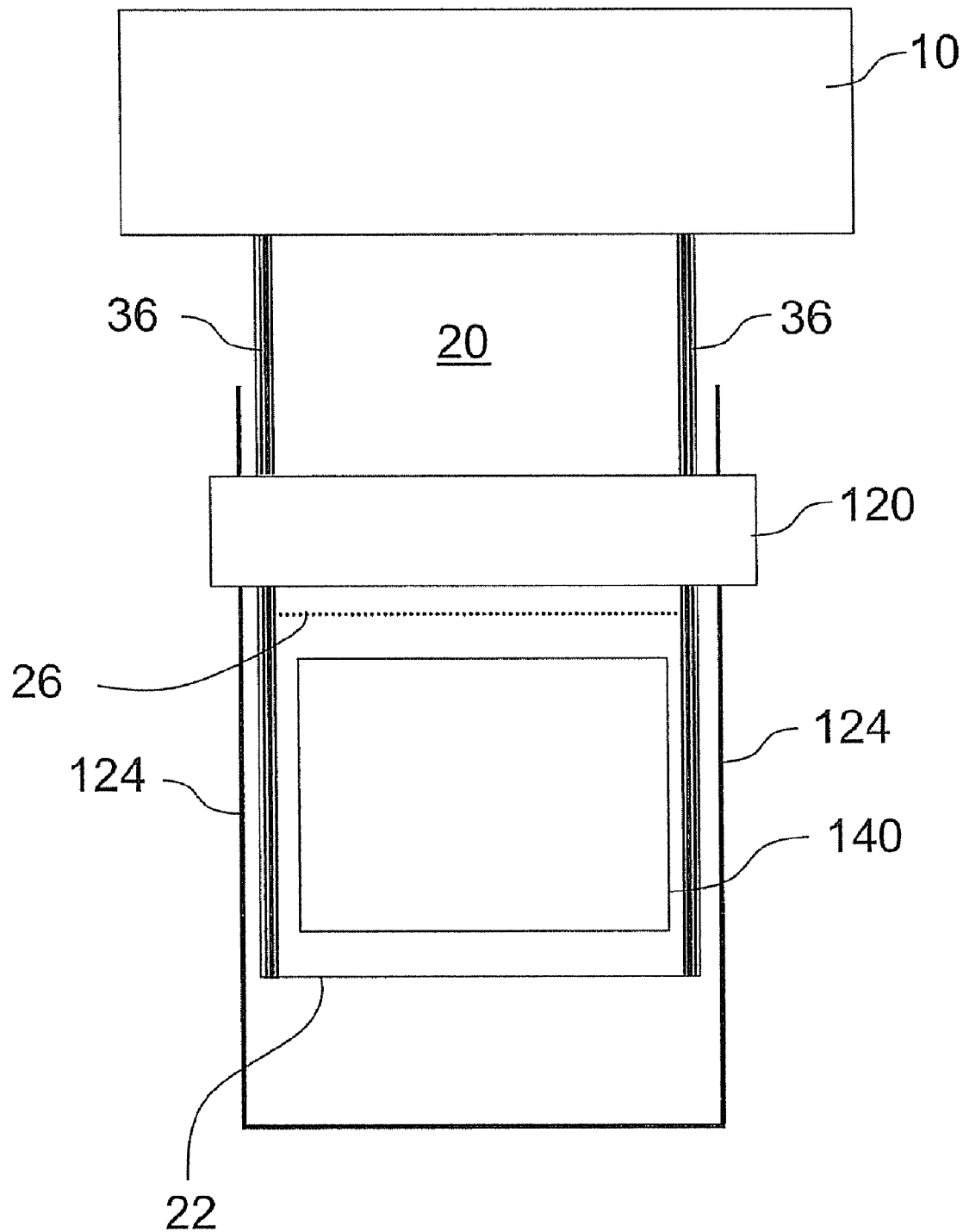
FIG. 2 is a front elevational schematic view of the ribbon extending from a fusion glass fabrication apparatus.
Figure 3:
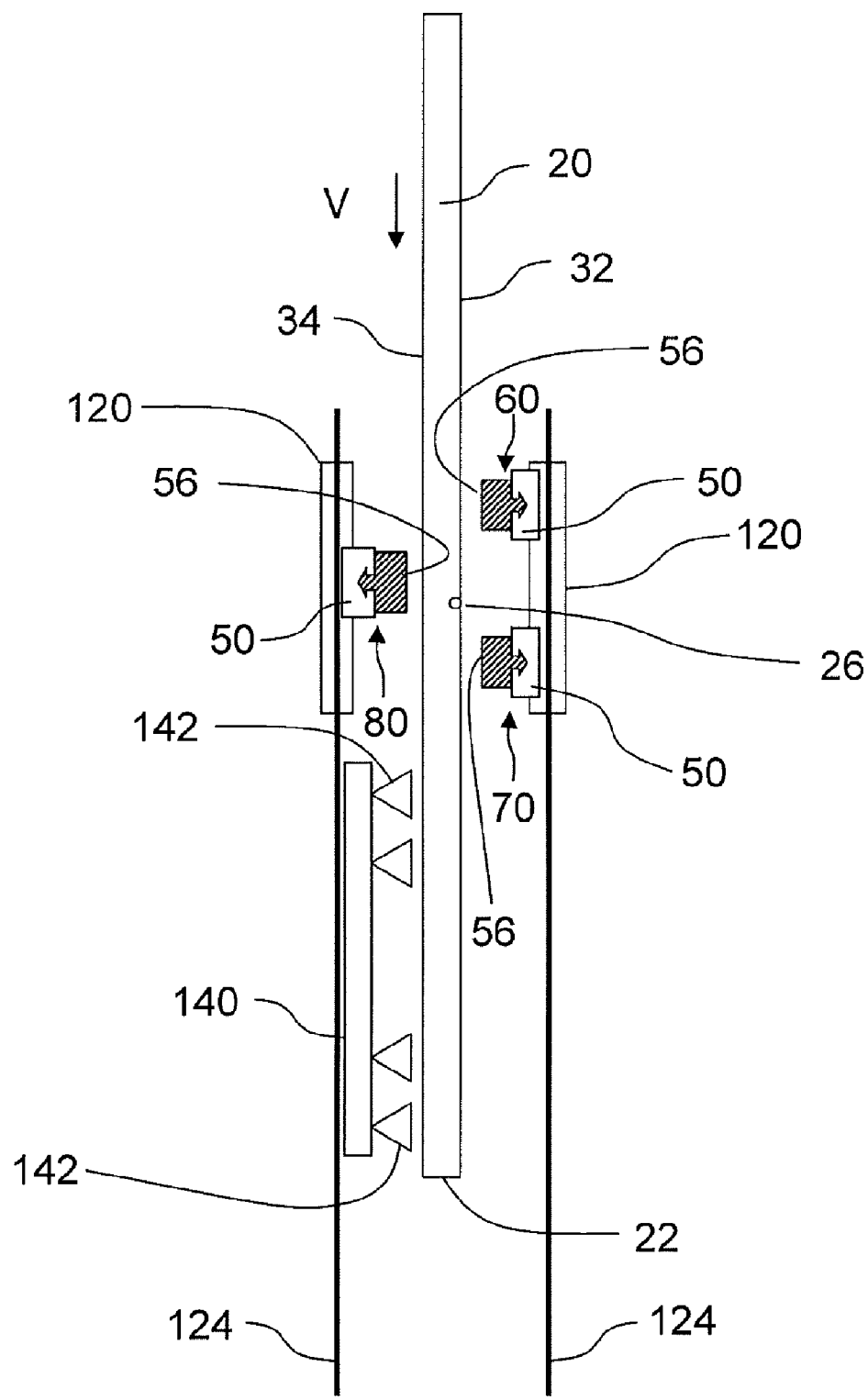
FIG. 3 is a side elevational schematic view of the ribbon with the upstream press bar and an offset upstream backing bar in a retracted position.

For purposes of definition and as best shown in FIG. 3, as ribbon 20 descends from root 14, the ribbon travels at a velocity vector V describing movement of the ribbon and forms a generally flat configuration having a generally planar first side 32 and a generally planar second side 34. In certain configurations, ribbon 20 includes lateral beads or bulbous portions 36 (shown in FIG. 2) which are sized for engagement by fixed rollers 16 or control surfaces during travel of the ribbon from isopipe 12. With respect to ribbon 20, the terms "opposed" or "opposing" mean the contact on both first side 32 and second side 34 of the ribbon 20.

Depending upon the stage or operation within the sequence, the term "upstream" means between the intended location of a score line 26 (or the actual location of the score line) and root 14. The term "downstream" means between the intended location of score line 26 (or the actual location of the score line) and the terminal end 22 of ribbon 20. Other uses of the terms upstream and downstream shall refer to the specific location of interest, and mean toward root 14 or toward terminal end 22 of ribbon 20, respectively.

The separation of a pane 24 from ribbon 20 occurs within a given distance range from root 14. That is, under constant operating parameters, the glass ribbon 20 reaches a generally predetermined solid state at a generally constant distance from the root 14, and is thus amenable to separation. The separation of pane 24 from ribbon 20 occurs along score line 26 formed in at least one side of the ribbon.

As discussed above in the Summary of the Invention, the present invention is directed at reducing the levels of undesirable distortion exhibited when panes 24 or substrates are flattened by providing for the repeatable and uniform separation of a pane of brittle material from a continuously moving ribbon 20 of the brittle material, while reducing the introduction of disturbances into the upstream ribbon.

The present apparatus includes upstream press bar 60 (FIG. 3) for engaging first side 32 of ribbon 20 and upstream backing bar 80 for engaging second side 34 of the ribbon. Each of the upstream press bar 60 and upstream backing bar 80 contact ribbon 20 upstream of score line 26 to locally restrain the ribbon during and after separation of pane 24.

As seen in FIGS. 3-9, in further configurations, downstream press bar 70, secondary upstream backing bar 90 and downstream backing bar 100 can be employed.

Press bars 60, 70 and backing bars 80, 90, 100 are formed of a cross beam 50 and a contact surface 56, wherein the contact surface is usually a separate material than the cross beam. Cross beam 50 is a generally rigid member sufficient to remain substantially undeformed (undeflected) along the operable length of the bar during operating conditions. For example, deflections of less than approximately 0.005 inches and typically less than 0.003 inches along a 5 foot length of cross beam 50 have been found satisfactory. Aluminum or steel has been found to be a satisfactory material for cross beams 50. Press bars 60, 70 and backing bars 80, 90, and 100 are sized to extend substantially the entire length of score line 26, and provide a continuous line of contact with ribbon 20 along the score line 26.

The material forming the contact surface 56 is a polymeric material such as a thermoplastic, thermoset or thermoplastic elastomer. Silicone having a hardness of approximately 60 Shore A plus or minus 10, has been found a satisfactory material. However, it is understood that depending upon the configuration of the apparatus, and the desired characteristics of the interface between the respective bar and ribbon 20, the performance characteristics of the material forming the contact surface 56 can be changed. For example, upstream backing bar 80, when also functioning as the scoring bar, may be formed of a harder surface than upstream press bar 60.

Contact surface 56 can be connected to cross beam 50 by any of a variety of mechanisms including adhesives, bonding or friction fit. As shown in the FIGS. 6-9 and called out in FIGS. 10a-10d, cross beam 50 includes a channel 51 having a given cross section, and contact surface 56 includes a corresponding locking tab 57 for engaging the channel. Although contact surface 56 is set forth as a member defining a surface as well as locking tab 57, it is contemplated the contact surface can be limited to a surface layer or film disposed on a substrate, wherein the substrate performs the function of the locking tab.

Referring to FIGS. 10a-10d, contact surface 56 can define any of a variety of interfaces with ribbon 20. For example, contact surface 56 can define an inclined plane with respect to the surface of ribbon 20. In such configuration, as contact surface 56 engages ribbon 20, increased force is exerted along predetermined positions of the contact surface. Contact surface 56 extends along the length of score line 26 and contact ribbon 20 along an appropriate ½" length of the ribbon.

Each of the upstream press bar 60, upstream backing bar 80, downstream press bar 70, secondary upstream backing bar 90 and downstream backing bar 100 travel at a velocity vector substantially equal to the velocity vector V of ribbon 20. Press bars 60, 70 and backing bars 80, 90 and 100 are carried by a carriage 120 for translation with the appropriate velocity vector matching ribbon 20, as is known in the art.

For purposes of description, press bars 60, 70 and backing bars 80, 90, 100 are described in terms of travel on common carriage 120. Carriage 120 can be movable relative to a rail 124, wherein the movement of the carriage can be imparted by any of a variety of mechanisms including magnetic, mechanical, or electromechanical, such as motors, gears, and/ or rack and pinion. Thus, press bars 60, 70 and backing bars 80, 90, 100 can be moved with the same velocity vector V of ribbon 20, and upon contact with the ribbon maintain contact at a specific location on the ribbon.

In certain configurations, upstream backing bar 80 also functions as a score-nosing bar, without deviating from the present apparatus. That is, as seen in FIGS. 6-9, upstream backing bar 80 contacts second side 34 of ribbon 20 upstream of score line 26, as well as contacting the second side of the ribbon opposite the score line (or the intended position of the score line).

Figure 4:
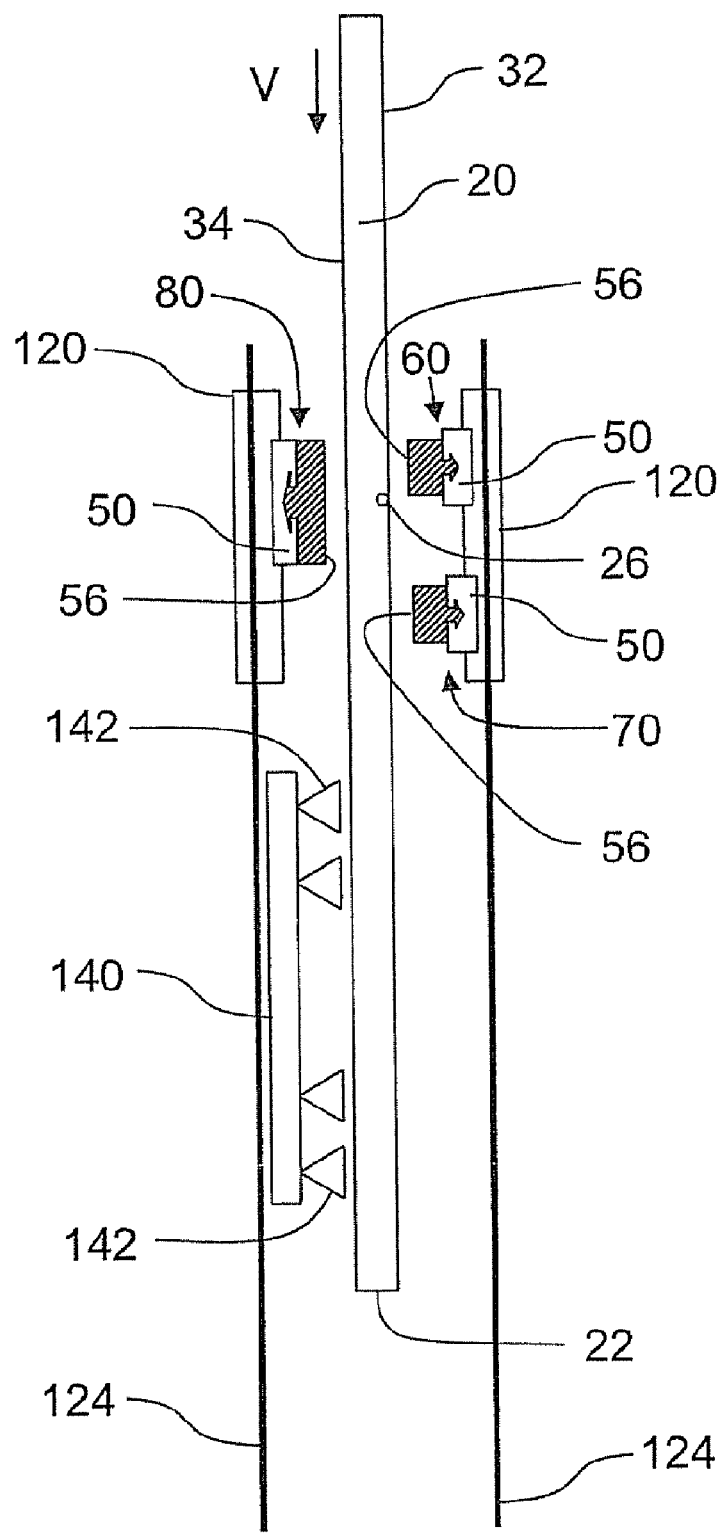
FIG. 4 is a side elevational schematic view of the ribbon with the upstream press bar opposite the upstream backing bar in a retracted position.
Figure 5:
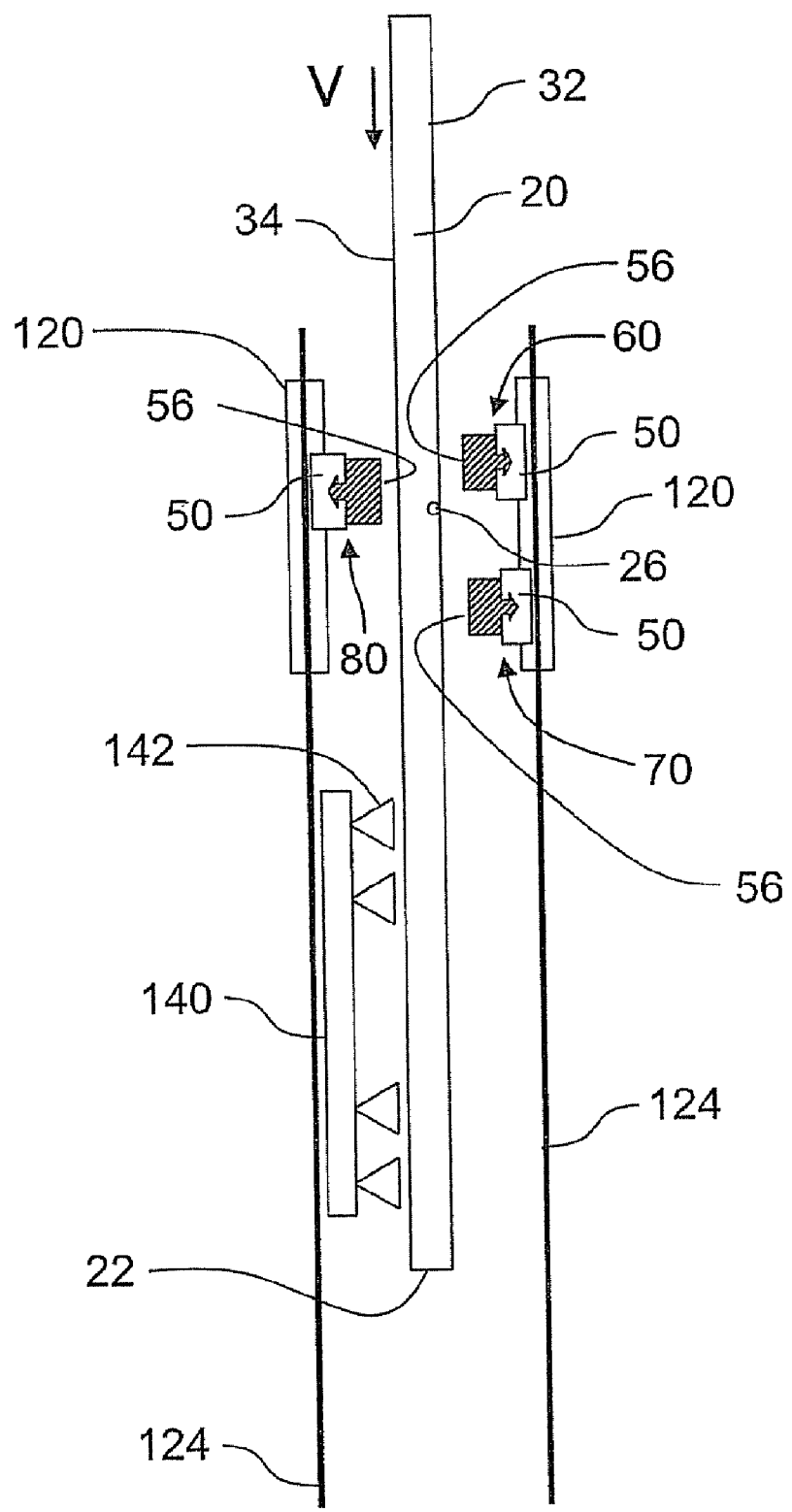
FIG. 5 is a side elevational schematic view of the ribbon with an overlapping upstream press bar and the upstream backing bar in a retracted position.

As shown schematically in FIGS. 3-5, upstream press bar 60 is connected to carriage 120 for engaging first side 32 of ribbon 20 and the upstream backing bar is connected to the carriage for engaging second side 34 of the ribbon to restrain the ribbon.

Upstream press bar 60 and upstream backing bar 80 can contact the opposing sides of ribbon 20 in an opposite, an offset, or overlapping relation. In the "opposite" relation seen in FIG. 4, upstream press bar 60 and upstream backing bar 80 engage ribbon 20 at a common distance from root 14. For ribbon 20 having a vertical velocity vector V, the opposite contact occurs at a given height (vertical position along the ribbon). In the "offset" relation seen in FIG. 3, upstream press bar 60 and upstream backing bar 80 engage ribbon 20 at different distances from root 14. That is, there is no common length of the ribbon contacted on first side 32 by upstream press bar 60 and second side 34 by upstream backing bar 80. In the "overlapping" relation seen in FIG. 5, a portion of each of the upstream press bar 60 and upstream backing bar 80 contact the respective side of ribbon 20 along a common length of the ribbon. For example, in the overlapping relation, if each of the upstream press bar 60 and upstream backing bar 80 has a ½" contact with the ribbon approximately ¼" of the contact of each of the upstream press bar and the upstream backing bar can overlap along a common ¼" length of the ribbon to restrain the ribbon.

Upstream press bar 60 and upstream backing bar 80 can be controlled to simultaneously or sequentially contact the respective sides of ribbon 20. However, it is advantageous to have both upstream press bar 60 and upstream backing bar 80 contacting ribbon 20, during and after separation of pane 24.

Upstream press bar 60 and upstream backing bar 80 can be movably connected to carriage 120 for movement between a retracted non-ribbon contacting position and an extended ribbon contacting position. Any of a variety of mechanisms can be used for moving upstream press bar 60 and upstream backing bar 80 relative to carriage 120. For example, cams can couple bars 60, 80 to carriage 120. Alternatively, mechanical actuators such as rack and pinion or threaded engagements, hydraulic or pneumatic pistons or cylinders can be used.

Thus, upstream press bar 60 and upstream backing bar 80 can move relative to carriage 120 between a retracted non-contacting position and an extended ribbon contacting position. Alternatively, upstream press bar 60 and upstream backing bar 80 can be fixed with respect to carriage 120, and the carriage can be moved relative to rail 124 to selectively engage the bars with ribbon 20.

In selected configurations, as seen in FIGS. 6a-6d, upstream press bar 60 and downstream press bar 70 can be incorporated into a single cross beam 50, and thus move in concert. Alternatively, upstream press bar 60 and downstream press bar 70 can be tied to a common carrier or yoke. Conversely, upstream press bar 60 and downstream press bar 70 can be independently controlled (operated) to provide sequential or independent contact with ribbon 20 as seen in FIGS. 7-9.

Similarly, upstream backing bar 80, secondary upstream backing bar 90 and downstream backing bar 100 can be carried by single cross beam 50 to move in concert between the retracted position and the extended position. Alternatively, each of the upstream backing bar 80, secondary upstream backing bar 90, and downstream backing bar 100 can be carried by an independent and independently actuated cross beam 50, as desired.

In one configuration, press bars 60, 70 and scoring assembly 130 contact first side 32 of ribbon 20 within an approximate 3 inch length of the ribbon. Thus, for those configurations in which score line 26 is equally spaced from the upstream press bar and downstream press bar, the bars are within approximately 1.5 inches from the score line.

Similarly, upstream backing bar 80, secondary upstream backing bar 90 and downstream backing bar 100 span approximately 3 inches or less along the length of the ribbon 20. In certain configurations, upstream press bar 60 can be within 2 inches or less than 1 inch from score line 26. Downstream press bar 70 can be less than 3 inches to less than approximately 1 inch from score line 26. In one configuration bars 60, 70 are located within a 37 mm length of ribbon 20.

Load sensors or force sensors, such as piezoelectric or spring biased sensors, can be connected between respective bars 60, 70, 80, 90, 100 and carriage 120 to measure the load on the respective bar. The sensors are connected to a central controller so that the desired loads can be determined, monitored and controlled.

The scoring assembly 130 is used to selectively form score line 26 in first side 32 of ribbon 20. Scoring assembly 130 can travel with one or both upstream press bar 60 and upstream backing bar 80. For purposes of description, scoring assembly 130 is set forth as carried by carriage 120. Thus, scoring assembly 130 will travel along the direction of travel of ribbon 20, at a velocity vector matching the ribbon 20. As scoring assembly 130 translates along the same direction of travel as ribbon 20, score line 26 can be formed to extend transverse to the direction of travel of the ribbon 20.

Scoring assembly 130 can be any of a variety of configurations well known in the glass scribing art, including but not limited to lasers, wheels, or points.

For those configurations of scoring assembly 130 that require contact with ribbon 20 to form score line 26, the scoring assembly is also movable between a retracted non-contacting position and an extended ribbon contacting position.

Typically, scoring assembly 130 cooperates with upstream backing bar 80 to form the score line 26 along first surface 32 of ribbon 20, such that the upstream backing bar also functions as a scoring bar opposite the contact of scoring assembly 130 and ribbon 20.

Score line 26 extends across a substantial width of ribbon 20. For the configuration of ribbon 20 having beads 36, score line 26 extends substantially the entire distance between the beads. Thus, the score line 26 can extend from approximately 70% of the width of ribbon 20 to 100% of the width. Typically, score line 26 has a depth of approximately 10% of the thickness of ribbon 20. The actual depth of score line 26 depends in part upon scoring parameters such as scoring pressure, the geometry of the scoring assembly, the thickness of the ribbon, the material of the ribbon, and the characteristics of glass fabrication apparatus 10. For representative ribbon thickness, score line 26 can have a depth ranging from approximately 70 microns to approximately 130 microns.

A pane engaging assembly 140 is employed to capture ribbon 20 downstream of score line 26 and control removal of pane 24 upon separation from ribbon 20. A representative pane engaging assembly and associated transporter are described in U.S. Pat. No. 6,616,025, herein expressly incorporated by reference.

The pane engaging assembly 140 includes pane engaging members 142, such as soft vacuum suction cups. It is understood other devices for engaging pane 24, such as clamps or fingers that engage the lateral edge of the ribbon (pane) can be used. The number of pane engaging members 142 can be varied in response to the size, thickness and weight of pane 24.

Pane engaging assembly 140 can engage ribbon 20 either before or after score line 26 has been formed. In addition, pane engaging assembly 140 can include a drop cylinder (not shown) for imparting a vertical movement of pane 24 from newly formed terminal end 22 of ribbon 20.

With respect to separation of pane 24 from ribbon 20 along score line 26, a combination of the bars contacting the ribbon is employed to propagate a crack along the score line 26. Any of a variety of combination of contacts between the bars and ribbon 20 can be employed to separate pane 24. For example, it is contemplated downstream press bar 70 can be employed to provide a breaking function (function as a breaking bar). Alternatively, both upstream press bar 60 and downstream press bar 70 can act cooperatively against ribbon 20 to induce separation along score line 26.

Generally, upper press bar 60 and upper backing bar 80 restrain a portion of ribbon 20 therebetween. By restraining the portion of ribbon 20, deviation of the ribbon from the gravity induced velocity vector is reduced. In addition, restraining a portion of ribbon 20 upstream of score line 26 allows the dampening characteristics of contact surfaces 56 to reduce the transmission of disturbances (energy) into the ribbon 26.

In contrast to prior systems, a localized bending is applied about score line 26, wherein the localized bending is sufficient to propagate a crack along the score line 26.

The contact of upstream press bar 60, upstream backing bar 80 (and secondary upstream backing bar 100) during and immediately after separation of pane 24 from ribbon 20, function to dampen the transmission of mechanical vibrations upstream in the ribbon 20. Thus, movement of ribbon 20 above score line 26 is thus reduced during the separation process. The continued contact between upstream backing bar 80 and upstream press bar 60 with ribbon 20 after separation absorbs a portion of the energy imparted by the separation process, and thus reduces the amount of disturbance that can migrate upstream in the ribbon 20.

In addition, by locating continuous lines of contact from the respective bars proximal to score line 26, such as within 3 inches (7.6 cm), a more uniform energy distribution is applied across ribbon 20 in the location of the score line 26, thereby improving separation characteristics of pane 24. It is believed accuracy of the separation line with respect to score line 26 is increased as bars 60, 80 (and 70) provide a more uniform stress along the length of the score line 26. This allows the position of score line 26 to vary by as much as 1 mm without sacrificing efficiency of the separation process.

Press bars 60, 70 and backing bars 80, 90, 100 can also be employed to substantially maintain (or create) a substantially planar configuration of the ribbon 20 in the area of score line 26 before or after formation of the score line 26.

For purposes of illustration, four different specific arrangements of upper press bar 60 and upper backing bar 80 contacting ribbon 20 are set forth in detail.

Figure 6C:
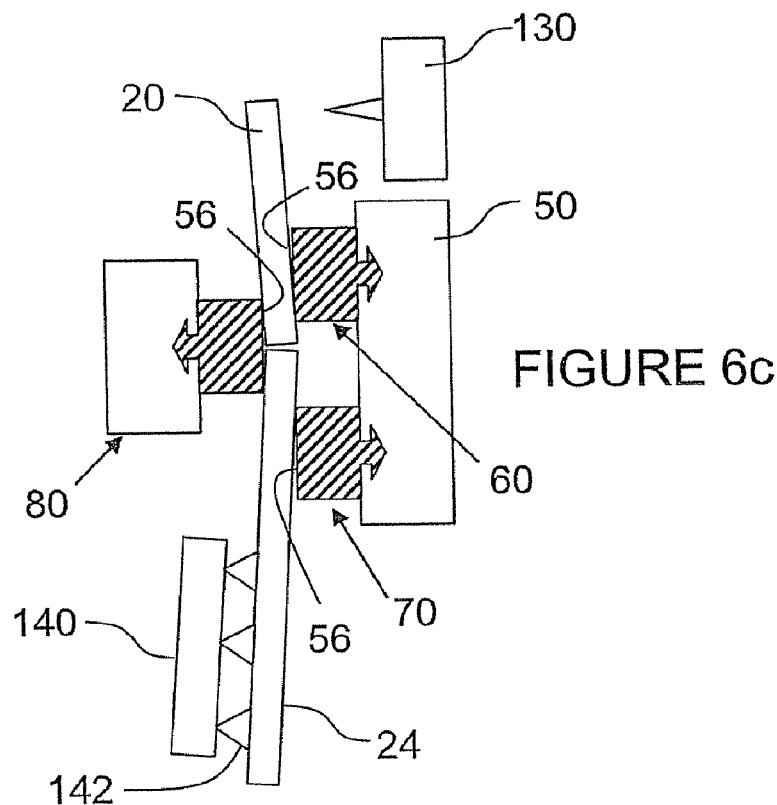

Referring to FIGS. 6a-6d, a first configuration of the assembly is employed to separate pane 24 from terminal end 22 of ribbon 20. As seen in FIG. 6a, upstream backing bar 80 is brought to contact second side 34 of ribbon 20 and scoring assembly 130 is drawn across at least a portion of the width of the ribbon 20 to form score line 26. Pane engaging assembly 140 is shown engaged with ribbon 20, prior to formation of score line 26. However, it is understood that the pane engaging assembly 140 can engage ribbon 20 after formation of score line 26. Referring to FIG. 6b, upstream backing bar 80 functions as the score-nosing bar or anvil. Although scoring assembly 130 is shown as returning to an upstream position relative to upstream press bar 60, it is understood the scoring assembly 130 can move laterally (horizontally in FIG. 6b) between a scoring position and a non-scoring position. Subsequently to the formation of score line 26, upstream press bar 60 and downstream press bar 70 are brought into contact with first side 32 of ribbon 20 to locate score line 26 intermediate the upstream press bar 60 and the downstream press bar 70 and restrain a portion of the ribbon 20 upstream of score line 26 by the contact of upstream backing bar 80 and the upstream press bar 60 with the ribbon 20. Upstream press bar 60 and upstream backing bar 80 can be sized and located to contact ribbon 20 in either an offset, overlapping or opposite relation. Further, although upstream press bar 60 and downstream press bar 70 are shown as incorporated into single crossbeam 50, each press bar is called out as an individual structure. That is, each of the upstream press bar 60 and downstream press bar 70 can encompass respective contact surface 56 and a portion of the common crossbeam 50.

In FIG. 6c, upstream press bar 60 and downstream press bar 70 are urged towards upstream backing bar 80, while pane engaging assembly 140 draws the ribbon 20 from the vertical path and ribbon 20 is separated along score line 26. It is understood, upstream press bar 60 can contact ribbon 20 simultaneously with contact of downstream press bar 70, or prior to contact of the downstream press bar 70 with the ribbon 20. In either scenario, a portion of ribbon 20 is restrained between upstream press bar 60 and a portion of upstream backing bar 80, such that the ribbon 20 remains restrained upstream of the separation line, after separation of the ribbon 20.

Figure 6D:
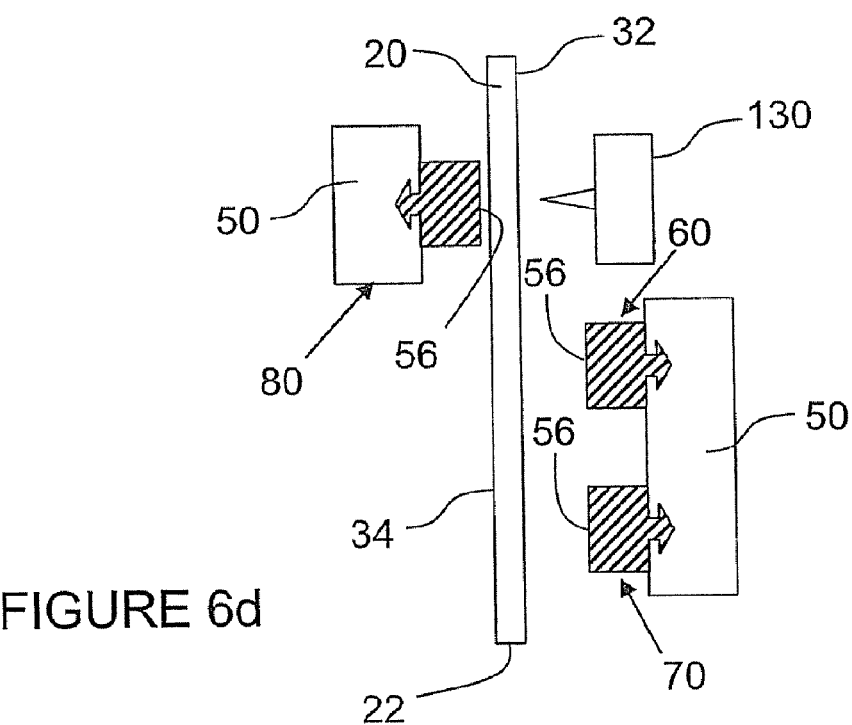

In FIG. 6d, upstream press bar 60, downstream press bar 70, upstream backing bar 80, and scoring assembly 130 are realigned with ribbon 20 for forming subsequent pane 24.

It is also noted that upon upstream press bar 60 and upstream backing bar 80 having at least a slight overlapping relation along the length of ribbon 20, the application of a bending moment to upstream ribbon 20 is reduced. The amount of overlap of upstream press bar 60 and upstream backing bar 80 is at least partially determined by the type and thickness of material forming the ribbon 20.

Figure 7D:
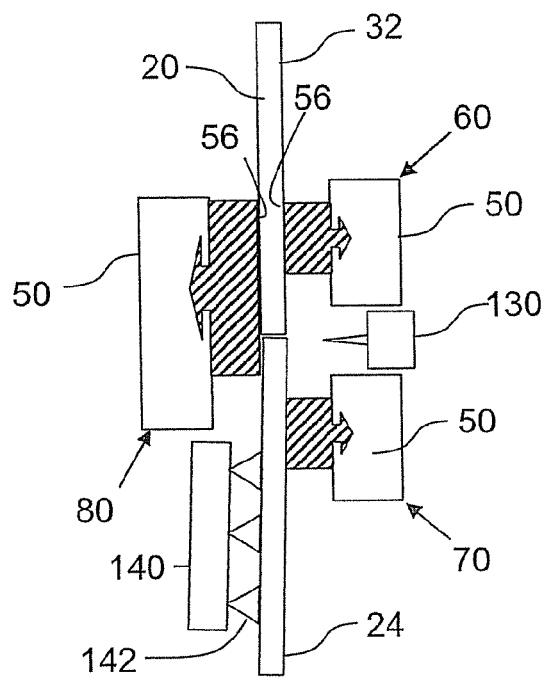
Figure 7E:
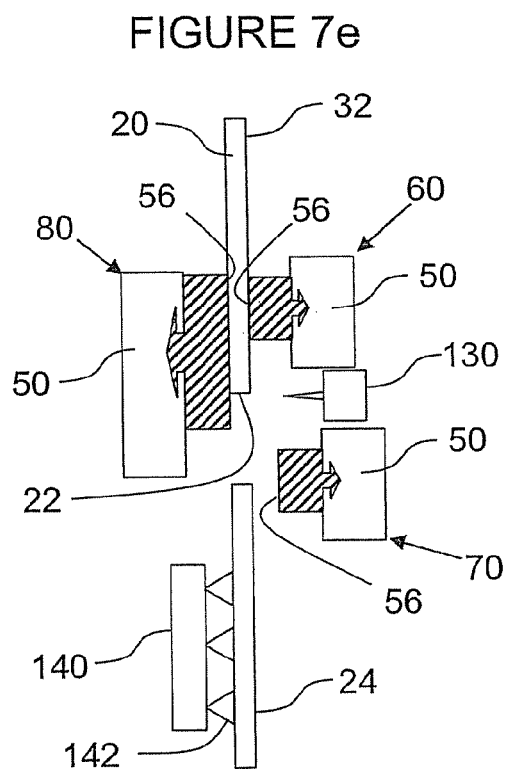
Figure 7F:
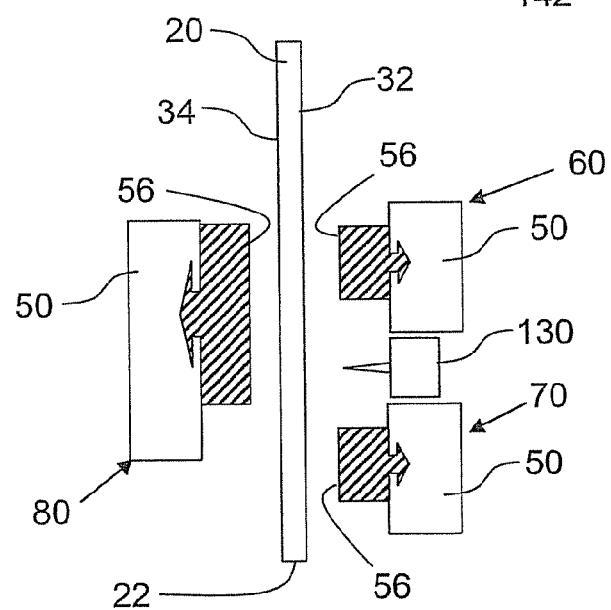

Referring to FIG. 7a, upstream backing bar 80 and at least upstream press bar 60 are brought into contact with ribbon 20, prior to forming score line 26 (and thus restrain the ribbon). Again, pane engaging assembly 140 is engaged with ribbon 20 prior to formation of the score line 26. However, it is understood that pane engaging assembly 140 can engage ribbon 20 after formation of score line 26. In FIG. 7b, scoring assembly 130 is brought into contact with first side 32 of ribbon 20 and bears against a portion of backing bar 80 to form score line 26. In FIG. 7c, scoring assembly 130 is retracted. In FIG. 7d, the downstream press bar 70 is urged against first side 32 of ribbon 20 to separate pane 24 from the ribbon 20. In FIG. 7e, downstream press bar 70 and scoring assembly 130 are in the retracted position, while upstream backing bar 80 and upstream press bar 60 remain in contact with ribbon 20, thereby dampening the transmission of any disturbance resulting from the separation of pane 24 from the ribbon 20. In FIG. 7f, the bars are returned to an initial position for separating a subsequent pane 24 from ribbon 20.

Again, the relation of upstream backing bar 80 and upstream press bar 60 (and downstream press bar 70) can be offset, opposite or overlapping. Although upstream press bar 60 and downstream press bar 70 can be simultaneously moved into contact with first side 32 of ribbon 20, and simultaneously moved after formation of score line 26 to separate pane 24, it is anticipated that independently moving the downstream press bar 70 to initiate crack propagation along the score line 26 is advantageous.

Referring to FIG. 8a, secondary upstream backing bar 90 and upstream press bar 60 are initially brought into contact with second side 34 and first side 32 of ribbon 20 respectively, In addition, downstream press bar 70 can optionally contact the first side 32 of ribbon 20 to further stabilize and control the ribbon 20. In FIG. 8b, upstream backing bar 80 and scoring assembly 130 are brought into contact with ribbon 20 to form score line 26 intermediate upstream press bar 60 and downstream press bar 70. A portion of upstream backing bar 80 contacts second side 34 of ribbon 20 upstream of score line 26. Thus, ribbon 20 is restrained upstream of score line 26 by a portion of upstream backing bar 80 and secondary upstream backing bar 90 on second side 34 of the ribbon 20 and upstream press bar 60 on first side 32 of the ribbon 20. Pane engaging assembly 140 engages ribbon 20. In FIG. 80, scoring assembly 130 is retracted after score line 26 is formed. In FIG. 8d, downstream press bar 70 is urged further against first side 32 of ribbon 20 causing pane 24 to separate from the ribbon 20. In FIG. 8e, separated pane 24 is removed by pane engaging assembly 140, and newly formed terminal end 22 of the ribbon 20 is restrained by a portion of upstream backing bar 80, secondary upstream backing bar 90 and upstream press bar 60. In FIG. 8f, the bars are returned to a ready position to begin the sequence for separating a subsequent pane 24 from ribbon 20.

With respect to the series of FIG. 9, the configuration is selected to reduce premature unintended crack propagation along score line 26. Generally, the configuration of FIG. 9 induces a local compression in first side 32 of ribbon 20 adjacent the score line 26. This local compressive force reduces the tendency of crack propagation along score line 26. The bar configuration shown in FIG. 9, provides for the initial compression and a subsequent tension across score line 26, and hence controlled crack propagation.

In the series of FIG. 9, pane engaging assembly 140 is employed to capture pane 24 and remove the pane from descending ribbon 20. As seen in FIG. 9a, upstream backing bar 80, secondary upstream backing bar 90 and downstream backing bar 100 are mounted in a common crossbeam 50, wherein the secondary upstream backing bar 90 and the downstream backing bar 100 project a greater distance than the upstream backing bar 80. That is, upstream backing bar 80 is recessed relative to secondary upstream backing bar 90 and downstream backing bar 100, so that second side 34 of ribbon 20 initially contacts the secondary upstream backing bar 90 and the downstream backing bar 100. Although secondary upstream backing bar 90 and downstream backing bar 100 can be of a softer, more easily compressible material than upstream backing bar 80, as upstream press bar 60 contacts first side 32 of ribbon 20, a slight bow is imposed in the ribbon 20 such that a local compressive force is created in the intended area of score line 26.

Although upstream backing bar 80 can be separately controlled from secondary upstream backing bar 90 and downstream backing bar 100, the apparatus is simplified by mounting upstream backing bar 80, secondary upstream backing bar 90 and downstream backing bar 100 to a common crossbeam 50, and employing different size contact surfaces 56.

Figure 9D:
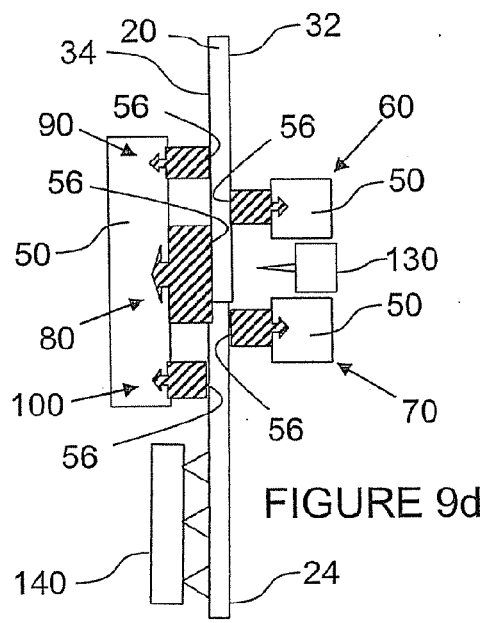
Figure 9E:
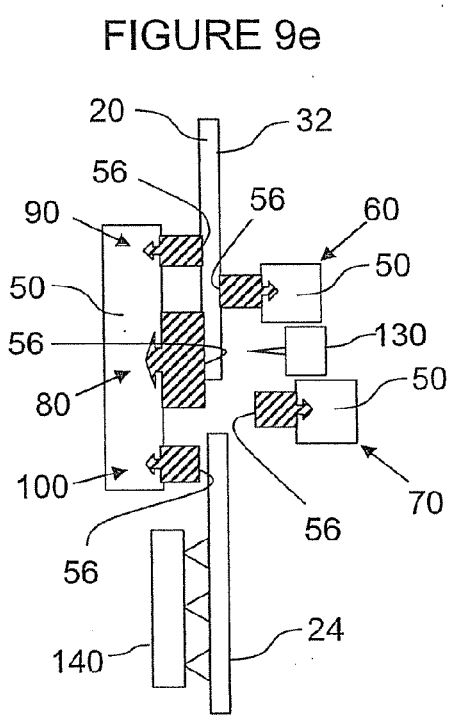
Figure 9F:
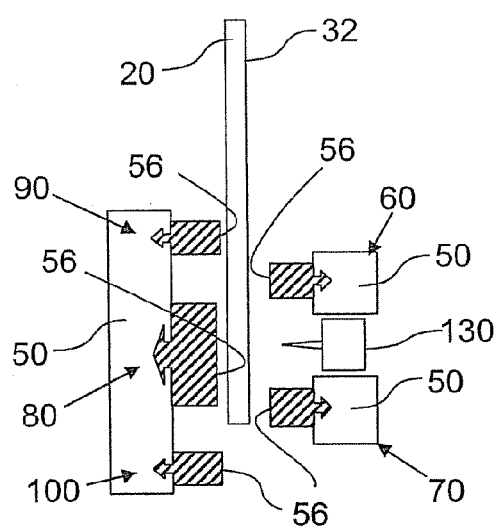
Figure 10A:
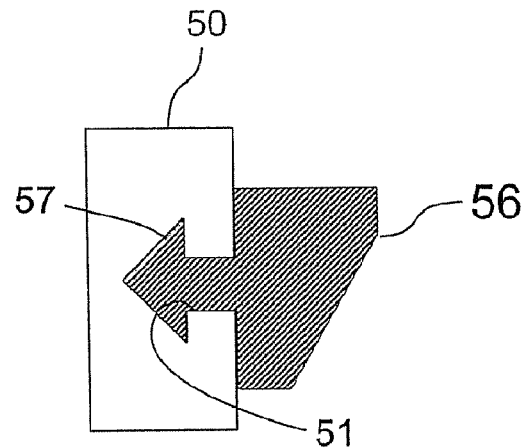
FIGS. 10a-10d are side elevational schematic views of the contact surface of the bars.
Figure 10B:
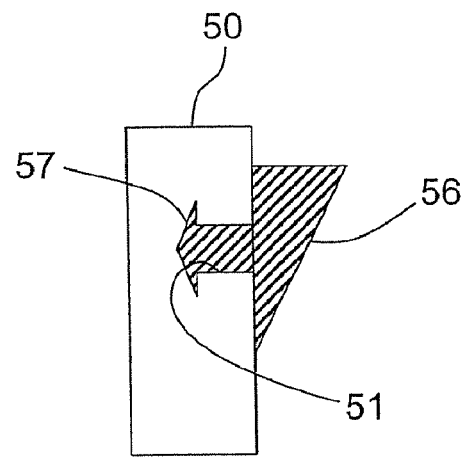
Figure 10C:
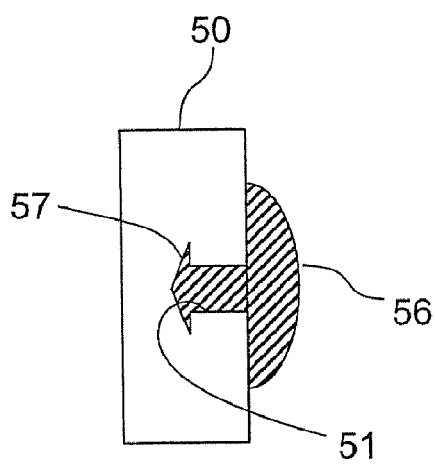
Figure 10D:
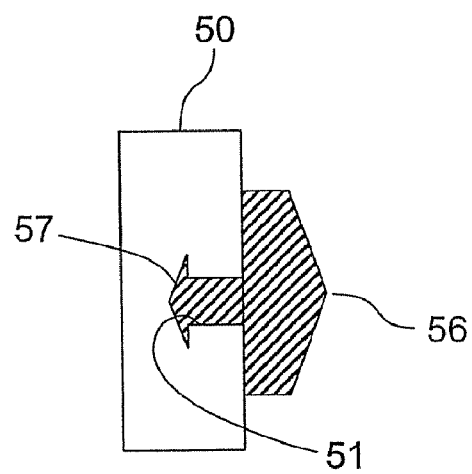

Referring to FIG. 9b, scoring assembly 130 then forms score line 26 in the locally compressed first side 32 of ribbon 20. Subsequently, as seen in FIG. 9c, scoring assembly 130 is retracted, and downstream press bar 70 is urged against the first side 32 of ribbon 20 with sufficient force to generate a localized tension in the first side 32 of the ribbon 20 in the area of score line 26. Pane 24 then separates from ribbon 20 as seen in FIG. 9d while ribbon 20 remains restrained between secondary upstream backing bar 90 and upstream backing bar 80 on second side 34, and upstream press bar 60 on the first side 32. Pane engaging assembly 140 removes pane 24 in FIG. 9e. Referring to FIG. 9f, the bars and scoring assembly 130 are returned to the ready position for separating a subsequent pane 24.

The present configurations thus provide for an opposed contact of ribbon 20 upstream of score line 26 (or score line location), wherein the upstream opposed contact can be in an offset, opposite or overlapping relation of upstream press bar 60 and upstream backing bar 80.

Subsequently, crack propagation is induced along score line 26 and pane 24 is separated from ribbon 20.

The upstream contact with ribbon 20 is maintained during and after the separation of pane 24, thereby reducing the introduction of disturbances that can migrate up the ribbon 20.

In certain configurations, the upstream restraining of ribbon 20 can be subsequent to formation of score line 26 and substantially simultaneous with the separating of the ribbon 20 along the score line 26. In further configurations, the upstream restraining of ribbon 20 precedes the formation of score line 26.

While the invention has been described in conjunction with specific exemplary embodiments thereof, it is evident that many alternatives, modifications, and variations will be apparent to those skilled in the art in light of the foregoing description. Accordingly, the present invention is intended to embrace all such alternatives, modifications, and variations as fall within the spirit and broad scope of the appended claims.

What is claimed is:

1. A method of separating a pane from a moving ribbon of brittle material, the method comprising:
    providing a moving ribbon of brittle material comprising a visco-elastic region, the moving ribbon of brittle material descending from a forming body and travelling in a moving direction with a vertical velocity vector V, wherein the moving ribbon has a width direction substantially orthogonal to the moving direction;
    providing a first press bar, a second press bar, and at least a first backing bar, each of the bars extending along the width direction of the moving ribbon;
    contacting a first side of the moving ribbon with the first press bar and contacting a second side of the moving ribbon with the at least first backing bar to restrain a portion of the ribbon, the first press bar and the at least first backing bar translating with a velocity vector substantially matching the ribbon vertical velocity vector V;
    engaging the ribbon with a pane engaging assembly;
    forming a score line in the first side of the moving ribbon opposite the at least first backing bar wherein a contact surface of the at least first backing bar contacts the moving ribbon along substantially the entire width of the moving ribbon so as to be in contact with the moving ribbon for the length of the score line during the forming of the score line;
    separating the pane from the ribbon along the score line downstream of the restrained portion of the ribbon while contacting the ribbon first side with the second press bar, the second press bar positioned downstream of the score line and translating with a velocity vector substantially matching the ribbon vertical velocity vector V, the score line being positioned between the first press bar and the second press bar during the separating; and
    releasing the restrained portion of the ribbon after separating the pane from the ribbon.

2. The method according to claim 1, wherein the score line is formed during the restraining of the portion of the ribbon.

3. The method according to claim 1, wherein the first press bar is offset from the at least first backing bar relative to the moving direction.

4. The method according to claim 1, wherein the first press bar at least partially overlaps the at least first backing bar relative to the moving direction.

5. The method according to claim 1, wherein the contacting of the second side of the moving ribbon with at least the first backing bar comprises contacting the second side of the ribbon with a second backing bar.

6. The method according to claim 5, further comprising contacting the second side of the moving ribbon with a third backing bar, wherein the first backing bar is positioned between the second and third backing bars and the first backing bar is recessed relative to the second and third backing bars to form a bow in the ribbon.

7. The method according to claim 6, wherein the bow forms a locally compressed area of the ribbon first side and the score line is formed in the locally compressed area.

8. The method according to claim 1, wherein the separating comprises urging the second press bar against the ribbon first side.

9. The method according to claim 8, wherein the separating comprises urging the second press bar toward the at least first backing bar.

10. The method according to claim 9, wherein the separating comprises drawing the ribbon from a vertical path with the pane engaging assembly.

11. The method according to claim 1, wherein the first and second press bars and the at least first backing bar are movably coupled to a carriage that translates with a velocity vector substantially matching the ribbon vertical velocity vector V.

12. The method according to claim 1, wherein the first and second press bars and the at least first backing bar are movable between a retracted ribbon non-contacting position and an extended ribbon contacting position.

13. The method according to claim 1, wherein the first and second press bars are moved into contact with the ribbon sequentially.

14. The method according to claim 1, wherein movement of the first press bar and the at least first backing bar are independently controlled.

15. The method according to claim 1, wherein the first and second press bars are moved into contact with the ribbon simultaneously.

16. The method according to claim 1, wherein the first and second press bars contact the ribbon along a substantial width of the moving ribbon so as to be in contact with the moving ribbon for substantially the entire length of the score line.

* * * * *